(12) United States Patent  
Dettlaff

(10) Patent No.: US 12,459,464 B2  
(45) Date of Patent: Nov. 4, 2025

(54) METHOD FOR IDENTIFYING A VEHICLE KEY, COMPUTER-READABLE MEDIUM, SYSTEM, AND VEHICLE

(71) Applicant: Bayerische Motoren Werke Aktiengesellschaft, Munich (DE)

(72) Inventor: Kilian Dettlaff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 18/563,338

(22) PCT Filed: Feb. 1, 2022

(86) PCT No.: PCT/EP2022/052270  
§ 371 (c)(1),  
(2) Date: Nov. 21, 2023

(87) PCT Pub. No.: WO2022/258232  
PCT Pub. Date: Dec. 15, 2022

(65) Prior Publication Data  
US 2024/0208463 A1 Jun. 27, 2024

(30) Foreign Application Priority Data  
Jun. 7, 2021 (DE) ............ 10 2021 114 520.1

(51) Int. Cl.  
*B60R 25/31* (2013.01)  
*B60R 25/24* (2013.01)  
(Continued)

(52) U.S. Cl.  
CPC .......... *B60R 25/245* (2013.01); *B60R 25/305* (2013.01); *B60R 25/31* (2013.01);  
(Continued)

(58) Field of Classification Search  
CPC ..... B60R 25/245; B60R 25/305; B60R 25/31; B60R 2325/205; G06T 7/20; G06T 7/50;  
(Continued)

(56) References Cited

U.S. PATENT DOCUMENTS

| | | | |
|---|---|---|---|
| 2010/0039224 A1* | 2/2010 | Okude | B60R 25/305 340/5.83 |
| 2020/0047715 A1 | 2/2020 | Park et al. | |
| 2020/0180561 A1 | 6/2020 | Lane et al. | |

FOREIGN PATENT DOCUMENTS

| | | |
|---|---|---|
| DE | 19542441 A1 | 5/1997 |
| DE | 102017126752 A1 | 5/2018 |

(Continued)

OTHER PUBLICATIONS

International Search Report corresponding to International Patent Application No. PCT/EP2022/052270, dated Jun. 7, 2022 (6 pages).

(Continued)

*Primary Examiner* — Nay Tun  
(74) *Attorney, Agent, or Firm* — Maginot, Moore & Beck LLP

(57) ABSTRACT

A method for identifying a vehicle key includes recognizing a person at least in part using a vehicle camera and detecting a position and a movement direction of the recognized person at least in part using the vehicle camera. The method also includes determining an antenna of the vehicle depending on the movement direction of the recognized person, and increasing a maximum transmission power of the determined antenna of the vehicle towards the position of the recognized person. The method further includes identifying a vehicle key of the person using the increased maximum transmission power of the determined antenna.

18 Claims, 2 Drawing Sheets

(51) Int. Cl.
  *B60R 25/30*   (2013.01)
  *G06T 7/20*    (2017.01)
  *G06T 7/50*    (2017.01)
  *G06T 7/70*    (2017.01)
  *G06V 20/52*   (2022.01)
  *G06V 20/58*   (2022.01)
  *G06V 40/10*   (2022.01)

(52) U.S. Cl.
  CPC .................. *G06T 7/20* (2013.01); *G06T 7/50* (2017.01); *G06T 7/70* (2017.01); *G06V 20/52* (2022.01); *G06V 20/58* (2022.01); *G06V 40/10* (2022.01); *G06T 2207/30196* (2013.01); *G06T 2207/30232* (2013.01); *G06T 2207/30252* (2013.01)

(58) Field of Classification Search
  CPC ............. G06T 7/70; G06T 2207/30196; G06T 2207/30232; G06T 2207/30252; G06V 20/52; G06V 20/58; G06V 40/10; G07C 2209/63; G07C 9/00309
  See application file for complete search history.

(56) References Cited

FOREIGN PATENT DOCUMENTS

| | | | |
|---|---|---|---|
| DE | 102016224912 A1 * | 6/2018 | ............. B60R 25/00 |
| DE | 102017219234 A1 | 5/2019 | |
| EP | 1099814 A1 | 5/2007 | |
| KR | 1020200071201 A | 6/2020 | |
| KR | 20200102010 A | 8/2020 | |
| WO | 2007006514 A1 | 1/2007 | |
| WO | 2013135381 A1 | 9/2013 | |
| WO | 2015113555 A1 | 8/2015 | |

OTHER PUBLICATIONS

Written Opinion corresponding to International Patent Application No. PCT/EP2022/052270, dated Jun. 7, 2022 (7 pages).
German Search Report corresponding to German Patent Application No. 10 2021 114 520.1, dated Jan. 19, 2022. (5 pages).

* cited by examiner

METHOD FOR IDENTIFYING A VEHICLE KEY, COMPUTER-READABLE MEDIUM, SYSTEM, AND VEHICLE

The present application is the U.S. national phase of PCT Application PCT/EP2022/052270 filed on Feb. 1, 2022, which claims priority of German patent application No. 102021114520.1 filed on Jun. 7, 2021, which is incorporated herein by reference in its entirety.

TECHNICAL FIELD

The disclosure relates to a methods and apparatus for identifying a vehicle key.

BACKGROUND

Access systems to vehicles are often contactless. A driver of the vehicle carries a transmitter, such as a key, a chip card, or a smartphone, on the body, which enables contactless access to vehicles. If the transmitter is in the reception range of an antenna of the vehicle, the vehicle can be unlocked. Often, the range of one or more of the vehicle antennas is technically limited in order to achieve high coverage. As a result, the vehicle may only be unlocked when a short distance between the transmitter and the antenna is reached.

It is therefore an object to identify a vehicle key from a greater distance between a contactless vehicle access transmitter and an antenna of a vehicle. In particular, it is an object to perform a vehicle function more conveniently.

SUMMARY

The above-stated object, as well as others, are achieved by the features, designs and developments of at least some embodiments disclosed herein.

A first aspect is a method for identifying a vehicle key. The method can be a computer-implemented method and/or a control unit-implemented method. The vehicle key can be a conventional vehicle key, a chip card with an integrated, digital vehicle key, or a smartphone with an integrated, digital vehicle key. The method includes recognizing a person by means of a camera of the vehicle. For example, the camera can be a driver's assistance camera of the vehicle. The vehicle may be a motor vehicle. The method also involves detecting a position and a movement direction of the recognized person by means of the vehicle camera, a determination of an antenna of the vehicle depending on the movement direction of the recognized person, and an increase of the maximum transmission power of the determined antenna of the vehicle towards the position of the recognized person. For example, the maximum transmission power can be radiated in a cone shape by the determined antenna towards the recognized person. Finally, the method includes the identification of a vehicle key or a mobile terminal comprising a digital vehicle key of the person using the increased maximum transmission power of the vehicle antenna.

Advantageously, a transmission power of a vehicle antenna can be controlled using a camera to identify a vehicle key from a greater distance. Thus, a vehicle function can be performed efficiently from a greater distance from the vehicle. This can efficiently increase convenience when approaching the vehicle and/or convenience when entering the vehicle.

According to an embodiment, the method may further include performing a vehicle function after identifying the vehicle key or the mobile terminal containing the person's digital vehicle key using the increased maximum transmission power of the vehicle antenna, wherein the vehicle function is preferably performed only when the movement direction of the person is towards the vehicle. This allows the vehicle function to be carried out efficiently. In particular, safety can be efficiently increased when performing the vehicle function.

In addition, the maximum transmission power of the determined antenna of the vehicle towards the position of the person and/or in the movement direction of the person can be temporarily increased. This allows the range of the antenna to be increased efficiently.

Alternatively or additionally, the maximum transmission power of the antenna can be temporarily increased depending on a distance of the person, and/or the transmission power of other antennas of the vehicle can be temporarily reduced depending on a distance of the person, so that a predetermined total maximum transmission power of all antennas of the vehicle is achieved. This allows the range of the antenna to be increased efficiently while at the same time complying with a specification regarding a total maximum transmission power of all antennas of the vehicle.

According to at least some embodiments, a total transmission power of all antennas belonging to a vehicle access system can be temporarily directed towards the person. This allows the detection range of the vehicle antennas to be increased efficiently.

In some embodiments, the method may also include performing of a key exchange protocol with the vehicle key or the mobile terminal containing the digital vehicle key using the increased maximum transmission power of the antenna for authenticating the vehicle key or the mobile terminal containing the digital vehicle key. This can be used to efficiently increase the convenience of vehicle access by the recognized person.

Vehicle functions can be provided to the recognized person from a greater distance by the vehicle.

In some cases, the person can be identified by means of the vehicle camera in a parking monitoring mode of the camera, and the parking monitoring mode of the camera can continuously monitor a close environment of the vehicle during a vehicle parking condition. This can be used to efficiently identify a person in the immediate vicinity of the vehicle and to adapt the vehicle antennas to the identified person.

Another aspect is characterized by a computer-readable medium for identifying a vehicle key, wherein the computer-readable medium contains instructions which perform the method described above when executed on a computer or a control unit.

Another aspect is characterized by a system for identifying a vehicle key, wherein the system is designed to carry out the method described above.

Another aspect is characterized by a vehicle containing the system for identifying a vehicle key described above.

Further features arise from the claims, the figures and the description of the figure. All features and combinations of features mentioned above in the description, as well as the features and combinations of features mentioned below in the description of the figures and/or shown in the figures alone, can be used not only in the combination specified in each case, but also in other combinations or on their own.

An exemplary embodiment is described below on the basis of the accompanying drawings. This results in further details, preferred designs and developments.

DETAILED DESCRIPTION

Figure 1:
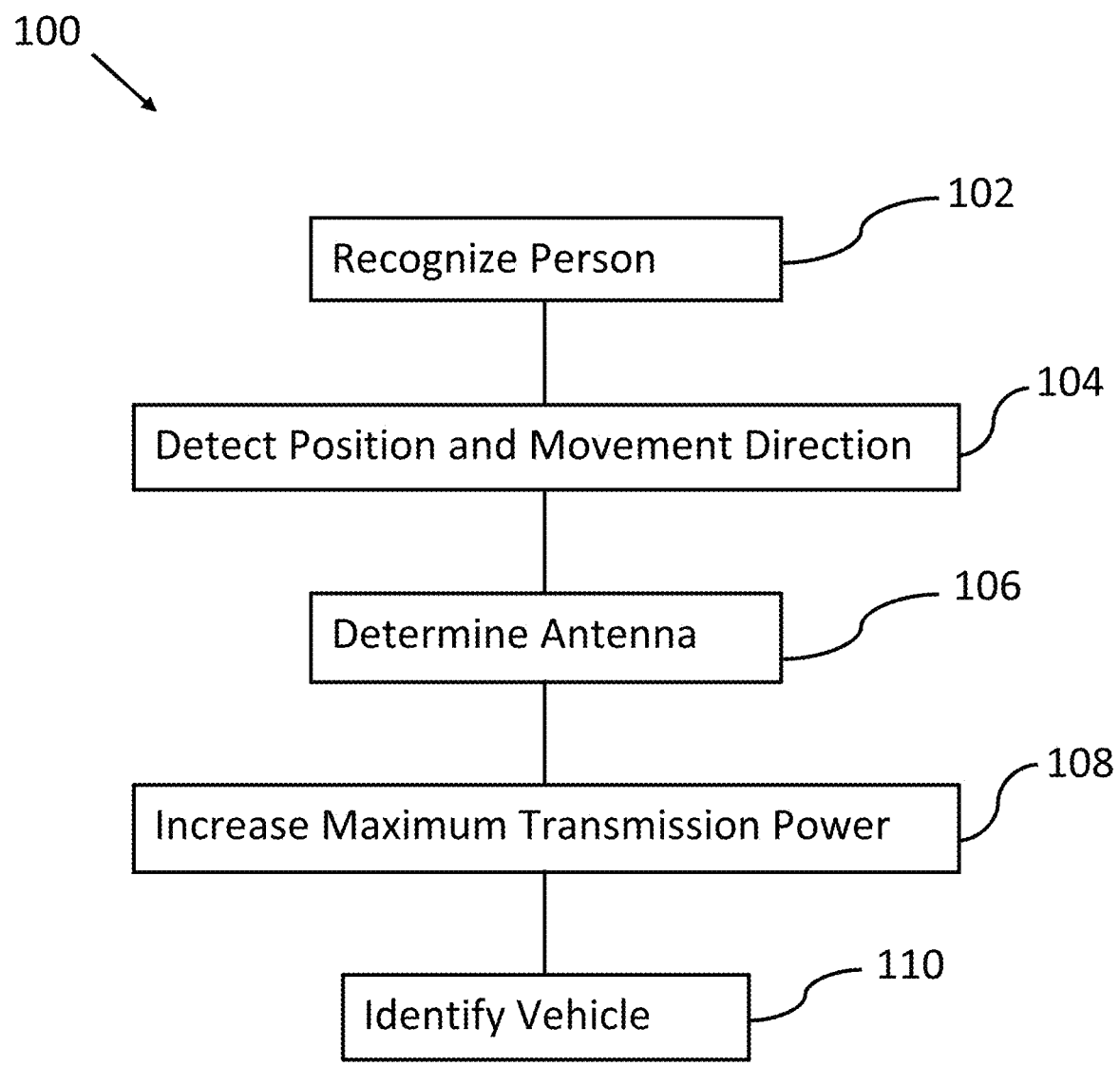
FIG. 1 shows schematically an exemplary method for identifying a vehicle key.

In detail, FIG. 1 shows an exemplary method 100 for identifying a vehicle key. The method 100 can recognize a person by means of a camera of the vehicle 102. Further, the method can detect a position and movement direction of the recognized person by means of the vehicle camera 104. The camera can be a driver assistance camera that has a parking attendant mode that is active when a vehicle is parked. The parking attendant mode of the driver assistance camera can monitor an environment of the parked vehicle to recognize a person in the field of view of the driver assistance camera. In addition, the driver assistance camera can authenticate the recognized person in the field of view of the driver assistance camera.

The method 100 can determine an antenna of the vehicle depending on the movement direction of the recognized person 106. Further, the method 100 can increase 108 a maximum transmission power of the determined antenna of the vehicle towards the position of the recognized person. The maximum transmission power towards the recognized person can be temporarily increased. In addition or alternatively, a total transmission power of all antennas of the vehicle can be temporarily oriented in the movement direction of the recognized person. In addition or alternatively, a sensitivity of the vehicle antenna in relation to the vehicle key. In addition or alternatively, a reception area of the vehicle antenna can be oriented towards the recognized person.

The method can also identify 110 a person's vehicle key using the increased maximum transmission power of the vehicle antenna. If the method 100 identifies the vehicle key, the method 100 can perform a welcome staging of the vehicle and/or allow vehicle access by unlocking and/or opening one or more doors and/or flaps of the vehicle.

Figure 2:
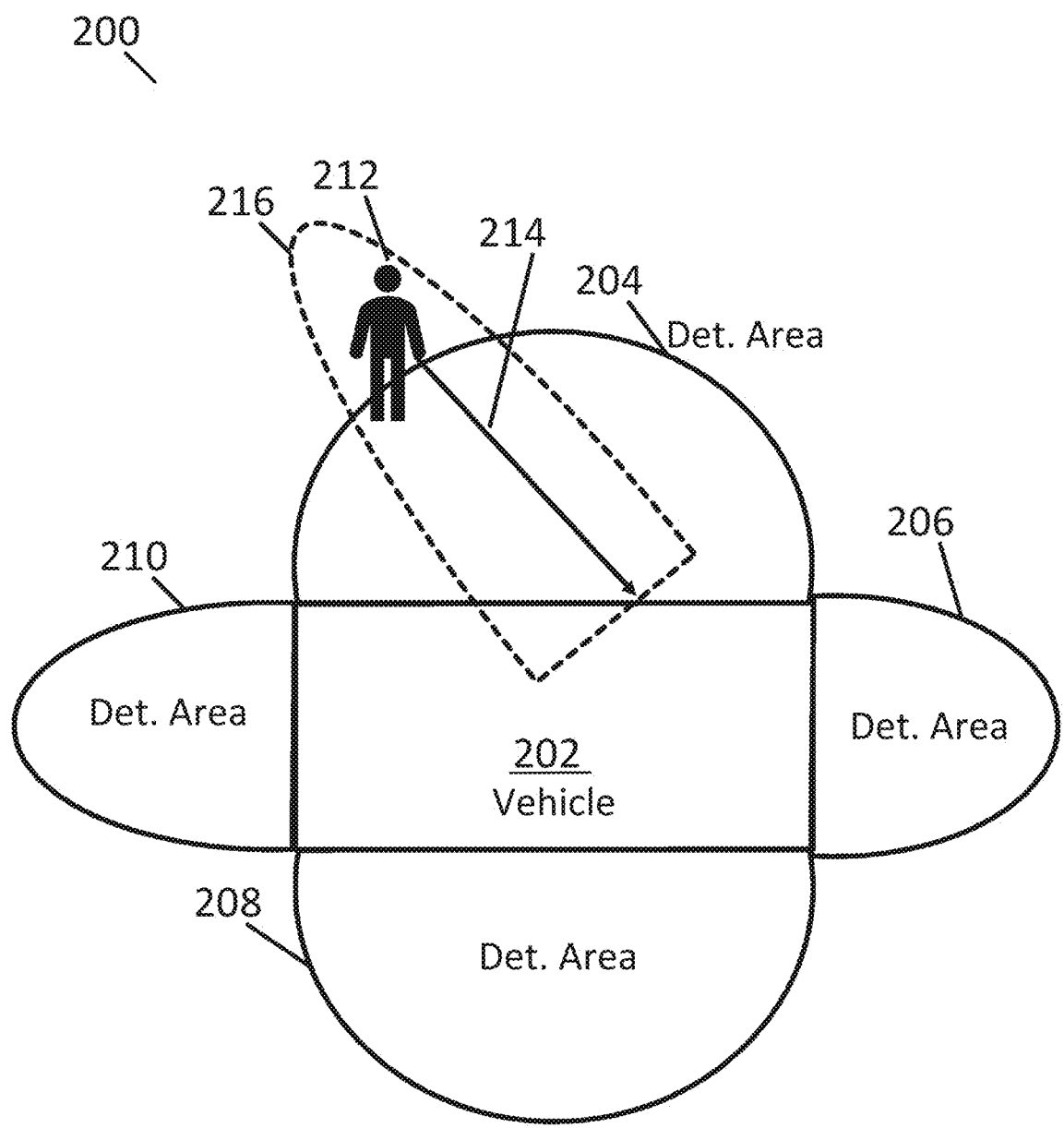
FIG. 2 shows schematically an exemplary system for identifying a vehicle key.

In detail, FIG. 2 shows an exemplary system 200 for identifying a vehicle key of a vehicle 202. The vehicle 202 contains four cameras. Each camera can capture and monitor a predetermined area 204, 206, 208, 210. A person 212 can be recognized by means of the vehicle camera when entering the area 204. Furthermore, the camera can determine a position and/or movement direction of the person 212 within the area 204. The area 216 indicates a maximum transmission power of an antenna of the vehicle that is oriented in a conical shape towards the recognized person 212. This means that a key carried by the recognized person 212 can be identified by the vehicle at an early stage and one or more vehicle functions can be performed.

Advantageously, by increasing the transmission power of a vehicle antenna, the vehicle key can be identified earlier. The convenience for the recognized person can be increased efficiently, for example by performing welcome staging, vehicle access and/or opening of the vehicle's doors from a greater distance specified by the detection range of the vehicle cameras.

REFERENCE SIGN LIST 100 method
102 recognizing a person
104 detecting a position and a movement direction
106 determining an antenna
108 increasing a maximum transmission power
110 identifying a vehicle key
200 system
202 vehicle
204 detection area of a camera
206 detection area of a camera
208 detection area of a camera
210 detection area of a camera
212 person
214 movement direction
216 detection area of an antenna

The invention claimed is:

1. A method for identifying a vehicle key, the method including:
   recognizing a person at least in part using a vehicle camera;
   detecting a position and a movement direction of the recognized person at least in part using the vehicle camera;
   determining an antenna of the vehicle depending on the movement direction of the recognized person;
   increasing a maximum transmission power of the determined antenna of the vehicle towards the position of the recognized person; and
   identifying a vehicle key of the person using the increased maximum transmission power of the determined antenna.

2. The method as claimed in claim 1, further comprising:
   performing a vehicle function after identifying the vehicle key using the increased maximum transmission power of the determined antenna,
   wherein the vehicle function is performed only when the movement direction of the person is towards the vehicle.

3. The method as claimed in claim 1, wherein the maximum transmission power of the determined antenna in the person's movement direction is temporarily increased.

4. The method as claimed in claim 3, wherein the maximum transmission power of the determined antenna is temporarily increased depending on the distance of the person.

5. The method as claimed in claim 1, wherein the maximum transmission power of the determined antenna is temporarily increased depending on the distance of the person.

6. The method as claimed in claim 5, wherein a transmission power of at least one other vehicle antenna is temporarily reduced depending on the distance of the person, so that a predetermined total maximum transmission power of all antennas of the vehicle is achieved.

7. The method as claimed in claim 1, wherein a transmission power of at least one other vehicle antenna is temporarily reduced depending on the distance of the person, so that a predetermined total maximum transmission power of all antennas of the vehicle is achieved.

8. The method as claimed in claim 1, wherein a total transmission power of all antennas belonging to a vehicle access system is temporarily directed towards the person.

9. The method as claimed in claim 1, further comprising:
   performing a key exchange protocol with the vehicle key using the increased maximum transmission power of the determined antenna to authenticate the vehicle key.

10. The method as claimed in claim 9, wherein the vehicle key comprises a digital vehicle key within a mobile terminal.

11. The method as claimed in claim 1, wherein the person is recognized at least in part using the vehicle camera in a parking monitoring mode of the camera; and
   wherein the parking monitoring mode of the camera continuously monitors a close environment of the vehicle during a vehicle parking state.

12. The method as claimed in claim 11, further comprising:
   performing a vehicle function after identifying the vehicle key using the increased maximum transmission power of the determined antenna,
   wherein the vehicle function is performed only when the movement direction of the person is towards the vehicle.

13. The method as claimed in claim 12, wherein the maximum transmission power of the determined antenna is temporarily increased depending on the distance of the person.

14. The method as claimed in claim 13, wherein a transmission power of at least one other vehicle antenna is temporarily reduced depending on the distance of the person, so that a predetermined total maximum transmission power of all antennas of the vehicle is achieved.

15. The method as claimed in claim 11, wherein a transmission power of at least one other vehicle antenna is temporarily reduced depending on the distance of the person, so that a predetermined total maximum transmission power of all antennas of the vehicle is achieved.

16. A non-transitory computer-readable medium for identifying a vehicle key, wherein the computer-readable medium contains instructions which perform the method as claimed in claim 1 when executed on a computer or a control unit.

17. A system for identifying a vehicle key, wherein the system is designed to carry out the method as claimed in claim 1.

18. A vehicle containing the system for identifying a vehicle key as claimed in claim 17.

* * * * *